UNITED STATES PATENT OFFICE.

GIOVANNI BEVILACQUA AND GIUSEPPE BEVILACQUA, OF GENOA, ITALY.

RUSTPROOF AND FIREPROOF COMPOSITION.

SPECIFICATION forming part of Letters Patent No. 733,573, dated July 14, 1903.

Application filed February 11, 1902. Serial No. 93,624. (No specimens.)

*To all whom it may concern:*

Be it known that we, GIOVANNI BEVILACQUA and GIUSEPPE BEVILACQUA, manufacturers, subjects of the King of Italy, both residing at 6 Piazzo Grillo Cattaneo, Genoa, Italy, have invented certain new and useful Improvements in Rustproof and Fireproof Compositions for Preventing the Irradiation of Heat, (for which we have applied for Letters Patent in the Kingdom of Italy on December 24, 1901,) of which the following is a specification.

The object of the present invention is to provide a rustproof and fireproof composition capable of preventing irradiation of heat, and which may be applied to iron chimneys, steam-tubes, kitchen-stoves, smoke-boxes, and the like, and generally to all metallic parts as well as to wooden parts exposed to heat. The said composition is an economical substitute for the peroxid of iron and red lead now used to protect iron against rust, and also for the asbestos-cords or felts now used to surround steam-conductors for the purpose of avoiding loss of heat. The new composition may also be used as a substitute for glazier's putty.

The composition forming the object of this invention is composed of heat-retaining, insulating, and highly-incombustible materials. These materials are mingled together in proportions, the quantity of each of the ingredients of which may vary according to requirements and circumstances, but will be generally in the proportions represented in the following recipe, the indicated proportions being, by weight, silicate drawn in filaments like cotton, seven parts; liquid silicate of potash, forty-five parts; powdered asbestos, thirty-seven parts; calcinated magnesia, 4.50 parts; graphite or other refractory coloring tints, 2.50 parts; powdered cork, two parts; powdered pozzolana, two parts; total, one hundred parts.

As may be easily seen from the above, this composition resists the action of the most intense fire and is not liable to crack, even at the highest temperatures. It easily adheres to sheet-iron and prevents oxidation of same. When it is applied to well-cleaned sheet-iron chimneys it maintains the various tints which may be applied thereto in splendid condition, which was not possible with the iron peroxid and red-lead varnishes hitherto used.

In order that the new composition may produce its maximum effect, it must be applied to the objects by means of a brush, and after the first layer is dried, which will be very soon, a second, a third, and even a fourth layer may be applied, according to the thickness desired. Generally, for the high-pressure steam-conductors a layer of two millimeters will be sufficient. By this layer a much better anti-irradiation effect is obtained than with asbestos board or felt.

If in addition to the said composition some other material preventing irradiation of heat is used over it, effects may be obtained which it was not possible to obtain heretofore. Thus the irradiation of heat being prevented, localities which are now intolerably hot become quite endurable. This diminution of temperature is furthermore proved by the fact that steam-tubes at a very high temperature when covered with the new composition may be touched or even manipulated without fear of burning the hands.

Having now fully described our said invention and the manner in which the same is to be performed, we declare that what we claim is—

A non-conducting rustproof composition comprising filaments of silicate, liquid silicate of potash, powdered asbestos, calcinated magnesia, a coloring material, powdered cork and powdered pozzolana in substantially the proportions specified.

In witness whereof we have hereunto set our signatures in the presence of two witnesses.

GIOVANNI BEVILACQUA.
GIUSEPPE BEVILACQUA.

Witnesses:
  A. FERRANI,
  G. B. CANYTRO.